(12) United States Patent
Keber et al.

(10) Patent No.: US 12,060,887 B2
(45) Date of Patent: Aug. 13, 2024

(54) FAN WITH COVER PLATE ON THE ROTOR BELL

(71) Applicant: ebm-papst St. Georgen GmbH & Co. KG, St. Georgen (DE)

(72) Inventors: Roland Keber, Woerth a. d. Isar (DE); Tobias Sieger, Geisingen (DE); Wolfgang Laufer, Aichhalden (DE); Clemens Guenter, Schramberg (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 407 days.

(21) Appl. No.: 17/165,717

(22) Filed: Feb. 2, 2021

(65) Prior Publication Data

US 2021/0254634 A1    Aug. 19, 2021

(30) Foreign Application Priority Data

Feb. 13, 2020  (DE) .................... 10 2020 103 772.4

(51) Int. Cl.
*F04D 29/70* (2006.01)
*F04D 25/06* (2006.01)
(Continued)

(52) U.S. Cl.
CPC ........... *F04D 25/082* (2013.01); *F04D 25/06* (2013.01); *F04D 25/0613* (2013.01);
(Continued)

(58) Field of Classification Search
CPC ...... F04D 29/701; F04D 25/06; F04D 29/325; F04D 25/0613; F04D 25/064;
(Continued)

(56) References Cited

U.S. PATENT DOCUMENTS 5,944,497 A *  8/1999  Kershaw ............. F04D 29/5806
                                                   417/368
7,616,440 B2 * 11/2009  Franz .................. F04D 29/5806
                                                  361/679.48
(Continued)

FOREIGN PATENT DOCUMENTS

DE          698 24 126 T2    9/2004
DE       10 2005 006 192 A1  3/2006
(Continued)

OTHER PUBLICATIONS

Chinese Office Action dated Oct. 25, 2022, which issued in the corresponding Chinese Patent Application No. 202110137064.6.
(Continued)

*Primary Examiner* — Dominick L Plakkoottam
(74) *Attorney, Agent, or Firm* — Dickinson Wright PLLC

(57) ABSTRACT

A fan comprising a fan wheel with impeller hub and impeller blades, and electric motor with a stator and rotor that can rotate about rotation axis (RA) and has a rotor bell comprising an axially front-side rotor bell base. Impeller hub is fastened to the rotor bell wherein, in the rotor bell base, at least one aperture ensures a cooling air flow from the rotor bell. Fan comprises a cover plate arranged on the rotor bell base with a central opening, wherein cover plate covers at least one aperture of the rotor bell base axially spaced at least in sections, so that between the rotor bell base and an inner surface of the cover plate a radially inward extending flow channel toward the central opening of the cover plate is formed. The cover plate radially outward comprises an inclined or curved course in the direction of the rotor bell base.

13 Claims, 3 Drawing Sheets

(51) Int. Cl.
*F04D 25/08* (2006.01)
*F04D 29/28* (2006.01)
*F04D 29/32* (2006.01)
*F04D 29/58* (2006.01)

(52) U.S. Cl.
CPC ......... *F04D 29/281* (2013.01); *F04D 29/325* (2013.01); *F04D 29/329* (2013.01); *F04D 29/5806* (2013.01); *F04D 29/701* (2013.01)

(58) Field of Classification Search
CPC .. F04D 29/281; F04D 29/329; F04D 29/5806; F04D 25/082; F04D 29/661; H02K 7/14; H02K 9/06
See application file for complete search history.

(56) References Cited

U.S. PATENT DOCUMENTS

| | | | | |
|---|---|---|---|---|
| 9,071,099 | B2* | 6/2015 | Lehmann | H02K 9/06 |
| 10,107,301 | B2* | 10/2018 | Evers | F04D 29/288 |
| 10,550,847 | B2* | 2/2020 | Berroth | F04D 29/5806 |
| 11,041,498 | B2* | 6/2021 | Okuda | F04D 29/5806 |
| 2002/0141866 | A1 | 10/2002 | Huang | |
| 2006/0051221 | A1* | 3/2006 | Chen | F04D 29/329 |
| | | | | 417/423.1 |
| 2007/0152519 | A1 | 7/2007 | Jarrah et al. | |
| 2019/0285076 | A1* | 9/2019 | Okuda | F04D 29/329 |

FOREIGN PATENT DOCUMENTS

| | | | |
|---|---|---|---|
| DE | 10 2005 006183 A1 | 8/2006 | |
| DE | 10 2006 006 702 A1 | 8/2007 | |
| DE | 10 2013 108 506 A1 | 2/2015 | |
| EP | 3 540 238 A1 | 9/2019 | |
| JP | H10 210727 A | 8/1998 | |
| JP | 2009522997 A | 6/2009 | |
| JP | 2015 139225 A | 7/2015 | |
| WO | WO-2008146154 A2 * | 12/2008 | ........... F04D 25/082 |

OTHER PUBLICATIONS

German Office Action dated Jun. 22, 2023, which issued in the corresponding German Patent Application No. 21 150 833.8.

* cited by examiner

FAN WITH COVER PLATE ON THE ROTOR BELL

FIELD

The disclosure relates to a fan with an improved noise performance.

BACKGROUND

From the prior art it is known to provide cooling bores in fans, particularly in fans with external rotor motors, in order to enable, in addition to the main volume flow conveyed by the fan wheel, a cooling air flow through the interior of the rotor bell past the heat generating motor components. As an example thereof, reference can be made to the disclosure of DE 10 2013 108 506 A1.

However, an additional cooling airflow through the rotor bell, which is subsequently fed to the main volume flow, usually leads to a higher noise level of the fan.

SUMMARY

The underlying aim of the disclosure therefore is to provide a fan which, in addition to the main volume flow, enables a cooling air flow for cooling motor components, without having to accept acoustic deterioration or such that such acoustic deterioration is at least reduced.

This aim is achieved by the combination of features according to claim 1.

Proposed according to the disclosure is a fan comprising a fan wheel with an impeller hub and impeller blades as well as an electric motor, in particular an external rotor motor, with a stator, with a rotor which can rotate about a rotation axis, and with a rotor bell. The rotor bell has an axially front-side rotor bell base and a circumferential rotor bell shell, wherein the impeller hub is fastened to the rotor bell. In the rotor bell base, at least one aperture is provided for ensuring a cooling air flow from the rotor bell. The fan furthermore comprises a cover plate arranged on the rotor bell base, with a central opening which at least partially, preferably completely, covers the at least one aperture of the rotor bell base axially spaced when viewed in projection, so that between the rotor bell base and an inner surface of the cover plate, a radially inward extending flow channel toward the central opening of the cover plate is formed. The cover plate, at least on its outer surface opposite the inner surface, radially outward comprises an inclined or curved course in the direction of the rotor bell base.

Via the at least one aperture in the rotor bell base, a cooling air flow led past the motor components, for example, the stator, which are accommodated in the rotor bell, can be guided out of the rotor bell and fed to the main volume flow of the fan, which is generated via the fan wheel. By the cover plate, the cooling air flow is here guided in a particular manner, namely from the axial outflow through the at least one aperture, first radially inward in the flow channel delimited by the cover plate, up to the central opening thereof, and subsequently in the opposite direction radially outward. Due to the radially outward inclined or curved course of the outer surface of the cover plate in the direction of the rotor bell base, the direction of the cooling air flow, in addition to the radial component, also experiences an axial component along the outer surface of the cover plate. The flow direction of the cooling air flow here advantageously is in contact with the outer surface of the cover plate. The flow direction of the cooling air flow can be directed in exactly the same manner in the opposite direction into the rotor bell. As a result, the noise development of the fan caused by the cooling air flow is reduced.

Here, an advantageous embodiment provides that the cover plate comprises an overextension section which extends completely over the at least one aperture in radial direction. Thus, it is ensured that the entire cooling air flow axially flowing out through the at least one aperture first hits the cover plate and is guided radially inward.

An advantageous development of the fan with regard to noise reduction is characterized in that the cover plate, in addition to the overextension section which extends completely over the at least one aperture in radial direction, comprises an overlap section which directly adjoins the overextension section, in which the cover plate extends beyond the at least one aperture and, when viewed in projection, overlaps with the rotor bell base which adjoins the at least one aperture radially inward. The overlap section leads to a particularly advantageous influencing of the flow of the cooling air flow after exiting from the least one aperture of the rotor bell base and lengthens the guiding first radially inward, before the cooling air flow is released into the main flow. The after-treatment of the cooling air flow after exiting through the rotor bell base is thus reinforced.

The at least one aperture is formed in an embodiment as an opening with a diameter D. A particularly advantageous noise-reducing effect is achieved if an extension of the overlap section in radial direction has a certain length UE, where $0.5 \leq UE/D \leq 1.5$. In this range, the effect of the after-treatment of the cooling air flow after exiting through the rotor bell base in radially inward direction is particularly good.

Furthermore, an embodiment of the fan provides that the linearly inclined or curved course of the outer surface of the cover plate extends continuously proceeding from a margin of the central opening of the cover plate. In addition, a continuous course of the outer surface is advantageous.

In a first embodiment example of the fan, the inner surface of the cover plate extends linearly radially outward. In a second embodiment example, the cover plate, on its inner surface, also has radially outward an inclined or curved course in the direction of the rotor bell base. In particular, it is then advantageous if the inner surface and the outer surface of the cover plate run parallel.

The cover plate is advantageously arranged on the impeller hub of the fan wheel or is formed as a single piece by the impeller hub and can thus ensure an interacting flow connection between the cover plate and the impeller hub.

Here, in an advantageous embodiment, the outer surface of the cover plate transitions directly into an impeller hub surface of the impeller hub, on which the impeller blades are arranged or formed. A direct flow connection then exists between the cover plate and the impeller hub, along which the main flow is also guided.

Furthermore, a design of the fan is characterized in that the impeller hub in radial direction extends completely over the at least one aperture of the rotor bell base and determines a coaxial opening toward the at least one aperture. The cooling channel between the cover plate and the rotor bell base is then determined on one side by the impeller hub.

In an embodiment of the fan, the impeller hub comprises a section extending into the at least one aperture of the rotor bell base, which determines a lining of the at least one aperture of the rotor bell base. Here, an advantageous embodiment is one in which the cover plate is arranged directly adjoining or radially spaced from a radial outer margin of the at least one aperture. In addition, this is also particularly advantageous if the inner surface of the cover plate has an inclined or curved course.

In the fan, as a variant, a substantially circumferential aperture can be provided in the rotor bell base. However, a preferred embodiment is one which is characterized in that in the rotor bell base a plurality of apertures spaced apart from one another in circumferential direction is provided, each having a diameter D. Here, with regard to fluid mechanics and therefore noise, an advantageous solution is one in which the size of the central opening is set in a certain ratio with respect to the diameter of the apertures. The central opening of the cover plate is designed as circular and has a diameter DPS. This diameter DPS is preferably in a range which is defined from the product of the square root of the number of the apertures and the diameter D of the apertures to the product of the number of the apertures and the diameter D of the apertures.

In terms of construction, an advantageous design of the fan is one in which the fan wheel comprises a base plate integrally formed with the impeller hub and a cover plate, between which, when viewed in axial direction, the impeller blades and the cover plate are arranged.

Furthermore, an advantageous embodiment of the disclosure is one which provides a cover plate designed as rotationally symmetrical.

BRIEF DESCRIPTION OF THE DRAWINGS

Other advantageous developments of the disclosure are characterized in the dependent claims or are represented in greater detail below together with the description of the preferred embodiment of the disclosure in reference to the figures. In the figures:

DETAILED DESCRIPTION

Figure 1:
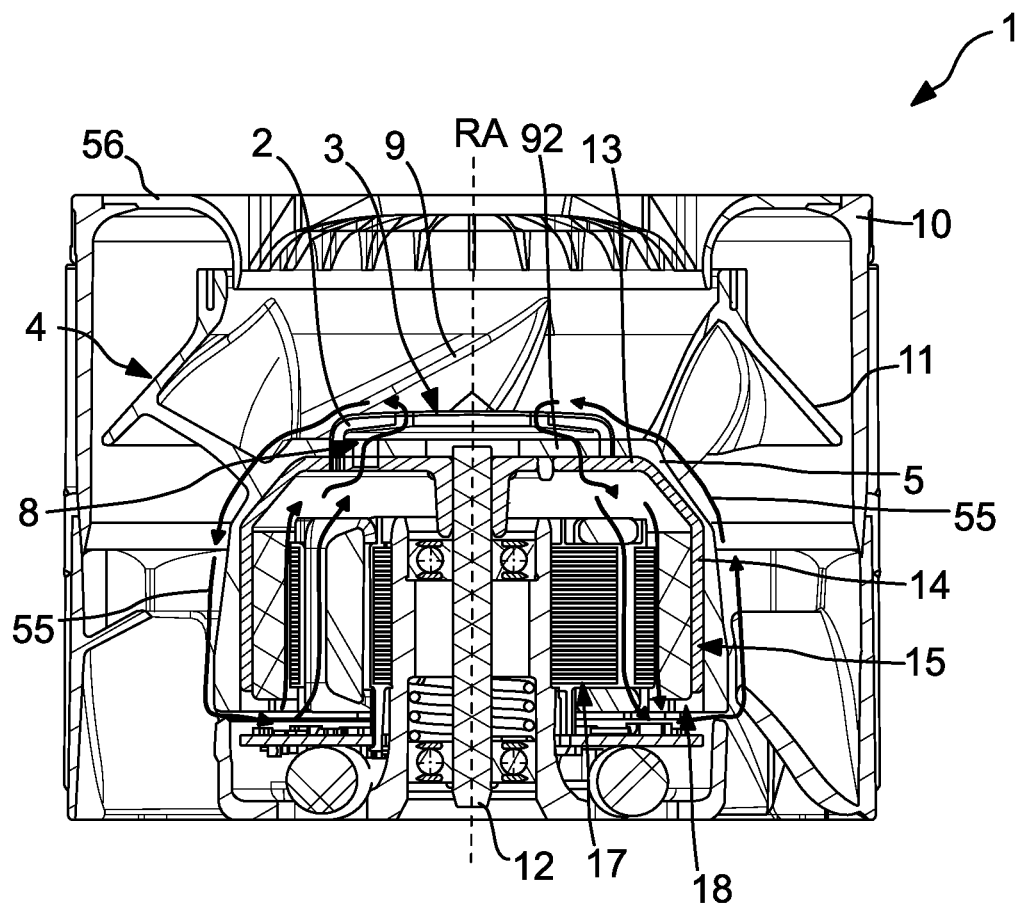
FIG. 1 shows a diagrammatic view of a fan in a first embodiment variant.

In FIG. 1, the fan 1, designed as an embodiment example of a diagonal fan, is represented diagrammatically in a lateral cross-sectional view. The fan wheel 4 and the electric motor with a stator 17 and with the rotor 18 which can rotate about the rotation axis RA and which is arranged on the fan shaft 12 mounted via multiple bearings are accommodated in the two-part housing 10. Axially adjoining the fan wheel 4, the inlet nozzle 56 is fastened on the housing 10. The fan wheel 4 comprises a cover plate 11, impeller blades 9 arranged in a blade ring, and a base plate 92 which is an integral component of the impeller hub 5. The rotor 18 comprises the rotor bell 15 formed by the axially front-side rotor bell base 13 and the rotor bell shell 14, which are enclosed by the impeller hub 5. In the rotor bell base 13, a plurality of apertures 8, arranged distributed in circumferential direction, is provided for ensuring the cooling air flow 55 between the interior of the rotor bell 15 and an area of the fan wheel 4.

The embodiment in FIG. 1 shows two variants of the cooling air flow 55 marked by the arrows. On the left side of the rotation axis RA, the cooling air flow 55 runs counterclockwise out of the interior of the rotor bell 15 into the area of the fan wheel 4; presented on the right side of the rotation axis RA the variant in which the cooling air flow 55 runs clockwise from the area of the fan wheel 4 into the interior of the rotor bell 15. The flow direction is dependent on the main flow of the fan 1, which is generated by the fan wheel 4.

Figure 2:
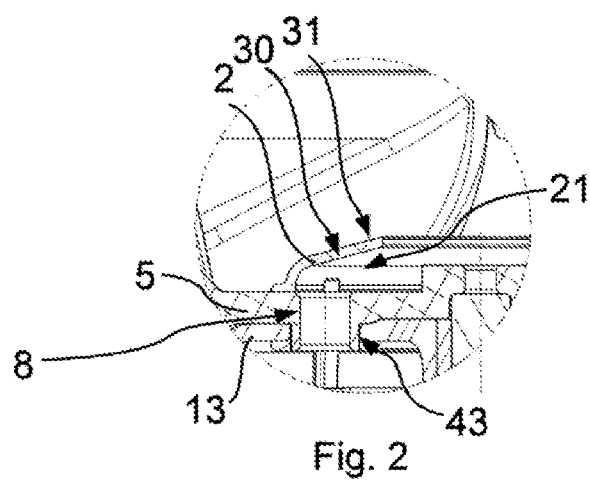
FIG. 2 shows a detail view concerning the arrangement of the cover plate according to the embodiment in FIG. 1.

On the rotor bell base 13, over the impeller hub 5, the rotationally symmetrical cover plate 2 is arranged and extends from the impeller hub 5 in axial and radially inward direction toward the rotation axis RA. The cover plate 2 comprises, about the rotation axis RA, the circular central opening 3 and covers the apertures 8 of the rotor bell base 13 axially spaced in a manner such that, between the rotor bell base 13 and the inner surface 30 of the cover plate 2, the flow channel 21 extending radially inward toward the rotation axis RA and toward the central opening 3 of the cover plate 2 is formed. Along the rotor bell base 13, in the embodiment shown, a portion of the impeller hub 5 additionally runs up to the fan shaft 12 and also extends along the apertures 8, where the impeller hub 5 determines a wall lining 43 of the apertures 8, as can be seen in FIG. 2. The detail view of FIG. 2 is not in exact agreement with the embodiment of FIG. 1; however, it can be applied directly in terms of design to the construction according to FIG. 1. The cover plate 2, with its inner surface 30, when viewed in radial direction, directly adjoins the apertures 8, so that the cooling air flow 55 directly in the area of the apertures 8 experiences a deflection by the cover plate 2.

The cover plate 2 as a whole and therefore both on its outer surface 31 and on its inner surface 30 comprises, proceeding from the margin of the central opening 3, an inclined course, angled with respect to a radial plane, in the direction of the rotor bell base 13, which transitions into a curved course. The cooling air flow 55 flows over the inclined outer surface 31 of the cover plate 2 and the directly adjoining impeller hub 5. The influencing of the cooling air flow 55 directly before or after the apertures 8, depending on the flow direction in consideration, leads to the noise reduction.

Figure 3:
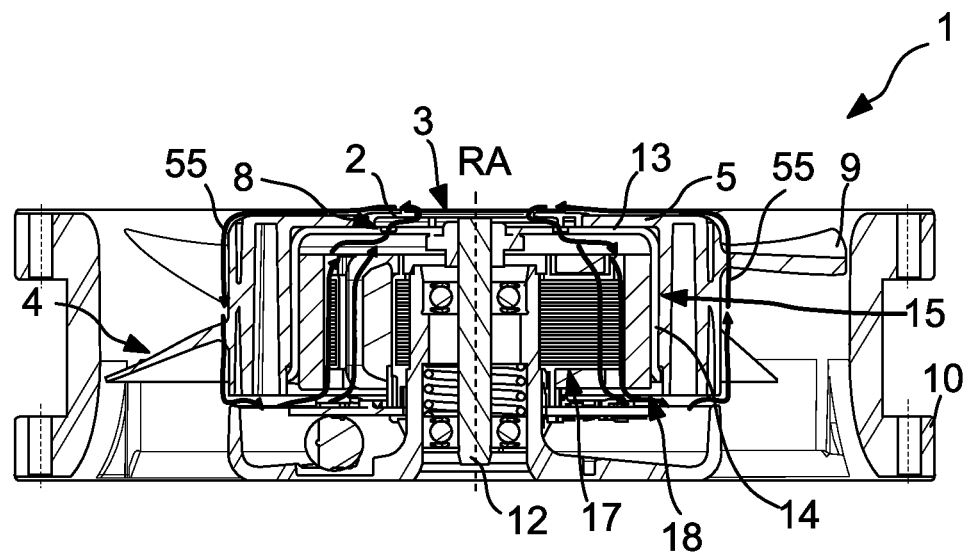
FIG. 3 shows a diagrammatic cross-sectional view of a fan in a second embodiment variant.
Figure 4:
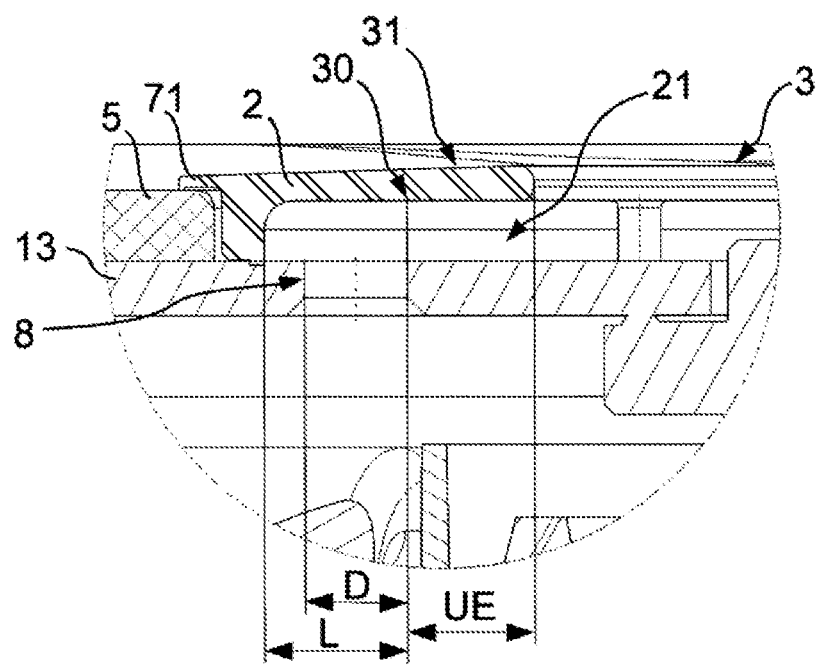
FIG. 4 shows a detail view concerning the arrangement of the cover plate in the embodiment according to FIG. 3.

FIG. 3 shows a second embodiment example of the fan 1 designed as axial fan, wherein the features disclosed for the embodiment according to FIG. 1 also apply unless they are otherwise described. The design is clearly more compact, since the impeller blades 9 of the fan wheel 4 are arranged radially outside with respect to the stator 17 and rotor 18. FIG. 4 shows a detail view of the area of the fan in which the cover plate 2 is arranged. The cover plate 2 lies directly on the rotor bell base 13, since the impeller hub 5 in this embodiment extends only up to the cover plate 2. A radial protrusion 71 on the cover plate 2 covers an area in which the cover plate 2 and the impeller hub 5 adjoin one another in abutment and optionally form a gap. On the inner side, the cover plate 2, with its inner surface 30, when viewed in radial direction, is spaced with respect to the apertures 8. However, an embodiment is also covered, in which the cover plate 2 directly adjoins the apertures 8, as shown in FIG. 2. The inner surface 30 of the cover plate 2 runs in the radial plane, while the outer surface 31, on the other hand, runs linearly inclined radially outward in the direction of the rotor bell base 13, so that the outer surface 31 of the cover plate 2 transitions directly into the impeller hub surface of the impeller hub 5. The margin of the central opening 3 is rounded.

Figure 5:
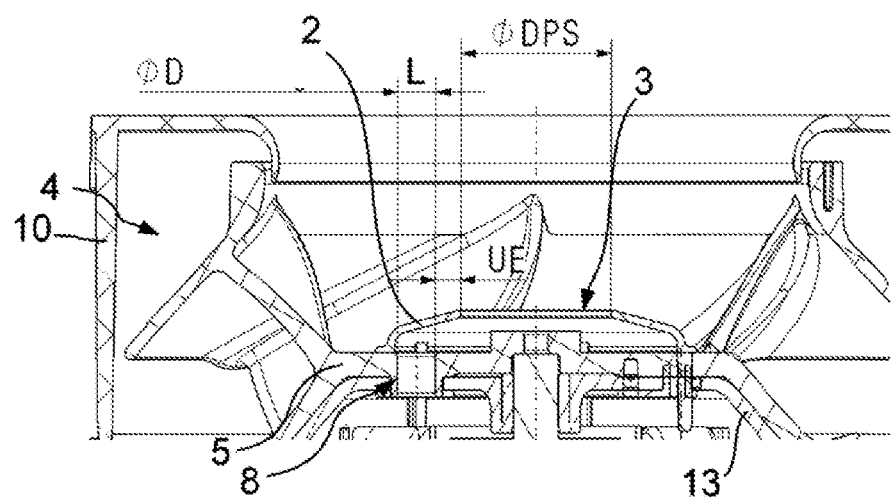
FIG. 5 shows a view concerning the arrangement of the cover plate in the embodiment according to FIG. 3.

With respect to FIGS. 4 and 5, for the embodiment examples, the diameter D of the respective apertures 8 and the diameter DPS of the central opening 3 are marked. In the two embodiments, the cover plate 2 comprises the overextension section L which extends completely over the apertures 8 in the radial direction. In the embodiment according to FIG. 5, the diameter D of the respective apertures 8 and the overextension section L are identical. Directly adjoining on the overextension section L, on the cover plate 2, the overlap section UE is provided, in which the cover plate 2 extends radially inward beyond the apertures 8 and thus overlaps with the area of the rotor bell base 13 which radially inwardly adjoins the apertures 8. In the embodiment according to FIG. 4, the overlap section UE has a ratio with respect to the diameter of the apertures 8 of 1.3, in the embodiment according to FIG. 5 said ratio is 0.7. The ratio is preferably adjusted as needed in a range between 0.5 and 1.5. The diameter DPS of the central opening 3 in both embodiments is greater than the sum of overextension section L and overlap section UE.

The invention claimed is:

1. A fan (1) comprising a fan wheel (4) with an impeller hub (5) and impeller blades (9) as well as an electric motor with a stator (17), with a rotor (18) which can rotate about a rotation axis (RA) and with a rotor bell (15) which comprises an axially front-side rotor bell base (13), wherein the impeller hub (5) is fastened to the rotor bell (15), wherein, in the rotor bell base (13), a plurality of apertures (8) is provided for ensuring a cooling air flow (55) from the rotor bell (15), wherein the fan (1) furthermore comprises a cover plate (2), arranged on the rotor bell base (13), with a central opening (3), wherein the cover plate (2) covers the plurality of apertures (8) of the rotor bell base (13) and is axially spaced at least in sections from the rotor bell base (13), so that a flow channel (21) is formed between the rotor bell base (13) and an inner surface (30) of the cover plate (2) that extends radially inward toward the central opening (3) of the cover plate (2) and radially beyond the at least one aperture (8), and wherein the cover plate (2), at least on the outer surface (31) thereof, radially outward has an inclined or curved course in the direction of the rotor bell base (13); characterized in that, in the rotor bell base (13), the plurality of apertures (8) are spaced from one another in circumferential direction, each having a diameter D, and the central opening (3) of the cover plate (2) is circular and has a diameter DPS which is defined by a range of (number of the apertures)$^{1/2}$*D≤DPS≤(D* number of the apertures).

2. The fan according to claim 1, characterized in that the cover plate (2) comprises an overextension section (L) which extends completely over each of the plurality of apertures (8) in radial direction.

3. The fan according to claim 1, characterized in that the cover plate (2) comprises an overextension section (L) which extends completely over each of the plurality of apertures (8) in radial direction, and an overlap section (UE) directly adjoining the overextension section (L), in which the cover plate (2) extends beyond the at least one aperture (8) and overlaps with the rotor bell base (13) which radially inwardly adjoins the at least one aperture (8).

4. The fan according to claim 3, characterized in that each of the plurality of apertures (8) is formed as an opening with the diameter D, and an extension of the overlap section (UE) in radial direction has a length (UE) such that 0.5≤UE/D≤1.5.

5. The fan according to claim 1, characterized in that the inclined or curved course of an outer surface (31) of the cover plate (2) extends continuously proceeding from a margin of the central opening (3) of the cover plate (2).

6. The fan according to claim 1, characterized in that the cover plate (2) is arranged on the impeller hub (5) or is formed as a single piece by the impeller hub (5).

7. The fan according to claim 1, characterized in that the cover plate (2), on the inner surface (30) thereof, radially outwardly has an inclined or curved course in the direction of the rotor bell base (13).

8. The fan according to claim 1, characterized in that the outer surface of the cover plate (2) transitions directly into an impeller hub surface of the impeller hub (5), on which the impeller blades (9) are arranged or formed.

9. The fan according to claim 1, characterized in that the impeller hub (5) extends in radial direction with respect to each of the plurality of apertures (8) of the rotor bell base (13) and defines an opening corresponding to each of the plurality of apertures (8).

10. The fan according to claim 1, characterized in that the impeller hub (5) comprises a section extending along each of the plurality of apertures (8) of the rotor bell base (13), which determines a lining of each of the plurality of apertures (8) of the rotor bell base (13).

11. The fan according to claim 1, characterized in that the cover plate (2) is arranged directly adjoining or radially spaced from a radial outer margin of each of the plurality of apertures (8).

12. The fan according to claim 1, characterized in that the fan wheel (4) comprises a base plate (92) integrally formed with the impeller hub (5) and a cover plate (11), between which, when viewed in an axial direction, the impeller blades (9) and the cover plate (2) are arranged.

13. The fan according to claim 1, characterized in that the cover plate (2) is designed to be rotationally symmetrical.

* * * * *